US006345904B1

(12) United States Patent
Lu et al.

(10) Patent No.: US 6,345,904 B1
(45) Date of Patent: Feb. 12, 2002

(54) FASTENING DEVICE FOR PROJECTOR LAMP

(75) Inventors: Chang-Hsing Lu, Chung-Li Shih; Tsung Jung Hsu, Kuei Shan Hsiang, both of (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 09/737,102

(22) Filed: Dec. 14, 2000

(30) Foreign Application Priority Data

Oct. 19, 2000 (TW) .......................................... 89121896

(51) Int. Cl.[7] ............................ B60Q 1/100; B60Q 3/00

(52) U.S. Cl. ....................... 362/368; 362/370; 362/390; 362/396; 362/549; 362/547; 362/430

(58) Field of Search ................................ 362/368, 370, 362/375, 374, 457, 369, 430, 390, 396, 549

(56) References Cited

U.S. PATENT DOCUMENTS 1,859,674 A * 5/1932 Michel ....................... 362/457
5,711,597 A * 1/1998 Unno ......................... 362/226
6,109,773 A * 8/2000 Nace .......................... 362/548

* cited by examiner

*Primary Examiner*—Thomas M. Sember
*Assistant Examiner*—Ali Alvi
(74) *Attorney, Agent, or Firm*—J. C. Patents

(57) ABSTRACT

A fastening device for projector lamp. The fastening device includes a lamp, a lamp casing and a strip-shaped spring that fastens the lamp onto the lamp casing. The lamp casing has a first sidewall, a second sidewall, a bottom wall and an upper connective structure, together they encloses a central space. The first sidewall has a first opening and the second sidewall has a hook groove. There is a second opening between the second sidewall and the bottom wall. The spring has a first end and a second end. A central portion of the strip-shaped spring can be latched by the hook groove. The first end of the spring is fixed by the first opening on the first sidewall. The second end of the spring has an internal recess structure. The second end of the spring passes through the second opening and fastens onto a recess groove on the lamp. The deform stress produced by passing the spring through the first opening, the hook groove and the recess groove is capable fixing the lamp relative to the lamp casing.

9 Claims, 9 Drawing Sheets

FASTENING DEVICE FOR PROJECTOR LAMP

CROSS-REFERENCE TO RELATED APPLICATION

This application claims the priority benefit of Taiwan application serial no. 89121896, filed Oct. 19, 2000.

BACKGROUND OF THE INVENTION

1. Field of Invention

The present invention relates to a projection device. More particularly, the present invention relates to a fastening device for a projector lamp that requires a single spring only.

2. Description of Related Art

Projector is a common office and household device. Using a projector, a small picture can be put on a relatively large screen for several people to look at all at once. For example, a lecturer can project some of the information related to the speech to a big screen for every participants of the lecture to read. With the rapid progress in electronic technologies, projector not only can project simple image but electronic images can also be projected onto a wall.

However, no matter what type of projector is used, images are generated by a projector lamp. Hence, images and projector lamp have a close and sensitive relationship with each other. If the direction of lamp projection is not on the pre-determined optical axis, brightness and color texture of the image on the projection will be affected. Therefore, fastening the lamp onto a lamp casing such that there is minimal deviation from the optical axis is an important factor for producing a quality image.

Conventionally, to prevent deviation of lamp projection direction, a plurality of springs is required in relation with the lamp casing. These springs are usually difficult to assemble. FIG. 1 is a perspective view looking from the bottom of a conventional structure for fastening the projector lamp to a lamp casing before a spring is positioned in the final position. FIG. 2 is a perspective view looking from the bottom of a conventional structure for fastening the projector lamp to a lamp casing after a spring is positioned in the final position. FIG. 3 is a perspective view looking from the top of a conventional structure for fastening the projector lamp to a lamp casing after a spring is positioned in the final position.

A lamp casing 100 is shown in FIGS. 1 to 3. The lamp casing 100 has a central space enclosed by four sidewalls so that a lamp 101 can mount inside the casing 100. In FIG. 1, only the left sidewall and the lower sidewall of the lamp casing can be seen. After the lamp 101 is positioned inside the lamp casing 100, a strip-shaped spring 102 and a sheet-shaped spring 110 (see FIG. 2) are used for fastening the lamp 101 in a designed positioned. Ultimately, the projection direction of the lamp 101 and the designed optical axis will coincide. As shown in FIG. 1, the left sidewall has a first opening 104, a second opening 106 and a third opening 108. The spring 102 must first penetrate the second opening 106 so that one end is fixed upon another opening 107 (see FIG. 3). The other end of the spring 102 is fixed upon the opening 104. After fixing the spring 102 on the destined openings 104, 106 and 107, stress created by deformation will fasten the lamp 101 onto the fours sidewalls of the lamp casing 100. The structure formed by the combination of the lamp 101 and the lamp casing 100 has a rectangular design. The lamp wall is constructed using non-explosive glass.

Besides the strip-shaped spring 102, the sheet-shaped spring 110 is also required. In FIG. 2, the sheet-shaped spring 110 is mounted through the opening 108. The lamp 101 is installed by pushing from one corner of the lamp to the other corner of the lamp wall. Hence, the lamp 101 has at least three corners fixed by the sheet spring 110 and the strip spring 102.

The aforementioned conventional method of fixing the lamp must rely on two or more springs. In particular, the strip spring 102 must pass through the openings 106 and 107. Hence, the step of assembling the lamp and the lamp casing together is difficult.

SUMMARY OF THE INVENTION

Accordingly, one object of the present invention is to provide a fastening device for projector lamp. The fastening device includes a lamp, a lamp casing and a strip-shaped spring that fastens the lamp onto the lamp casing. The lamp casing has a first sidewall, a second sidewall, a bottom wall and an upper connective structure, together they encloses a central space. The first sidewall has a first opening and the second sidewall has a hook groove. There is a second opening between the second sidewall and the bottom wall. The spring has a first end and a second end. A central portion of the strip-shaped spring can be latched by the hook groove. The first end of the spring is fixed by the first opening on the first sidewall. The second end of the spring has an internal recess structure. The second end of the spring passes through the second opening and fastens onto a recess groove on the lamp. The deform stress produced by passing the spring through the first opening, the hook groove and the recess groove is capable fixing the lamp relative to the lamp casing.

According to the invention, the hook groove is open-ended and hence the stripshaped spring can easily slip into position. Consequently, the assembly process is greatly simplified. In addition, the internal recess structure at the second end of the strip-shaped spring can combine with the recess groove on the lamp to fix the lamp, thereby eliminating the need for a conventional sheet-shaped spring. Since only a single spring is required in this invention, the fastening structure and the assembly process can both be simplified.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
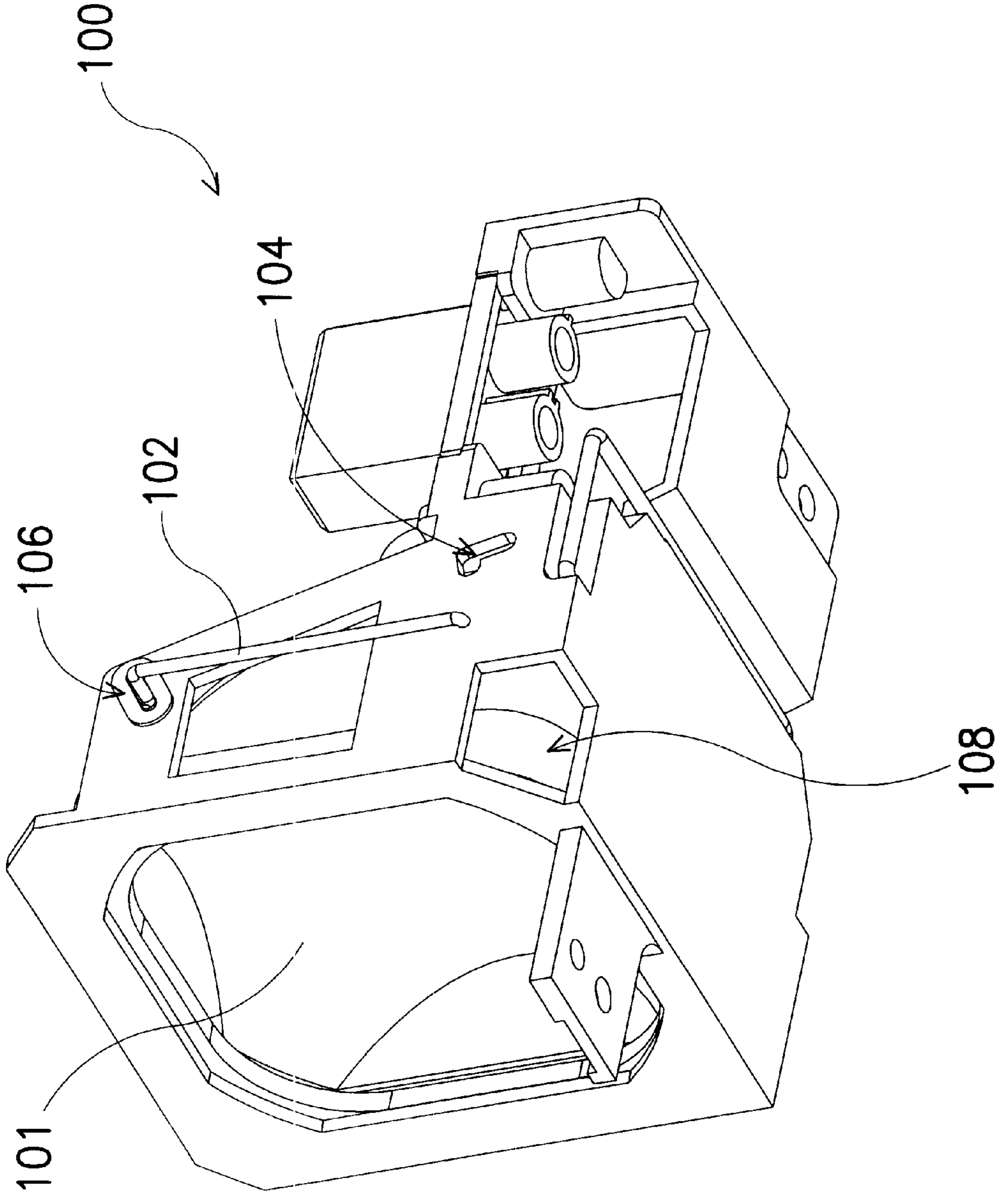
FIG. 1 (PRIOR ART)
FIG. 1 is a perspective view looking from the bottom of a conventional structure for fastening the projector lamp to a lamp casing structure before a spring is positioned in the final position.

Reference will now be made in detail to the present preferred embodiments of the invention, examples of which are illustrated in the accompanying drawings. Wherever possible, the same reference numbers are used in the drawings and the description to refer to the same or like parts.

One major aspect of this invention is the utilization of a recess groove on the projector lamp so that only a single spring is required to fasten the lamp onto a lamp casing. Furthermore, the spring is assembled by inserting into an open-ended hook groove so that the spring can easily slip onto a fixed position. The following embodiment is a more detailed explanation of the fastening device that joins the protector lamp and the casing together.

Figure 4:
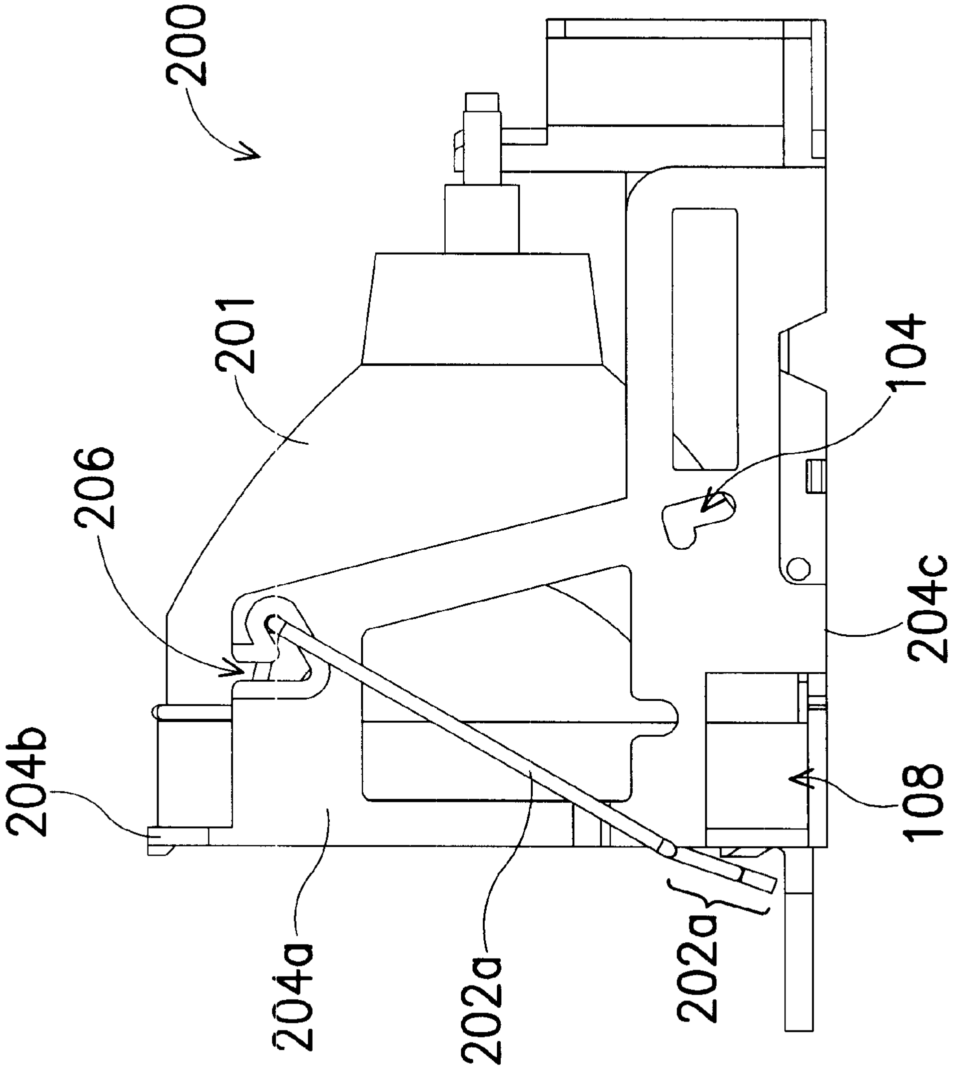
FIG. 4 is a side view showing a fastened lamp inside a lamp casing before a spring is positioned in the final position according to this invention.

FIG. 4 is a side view showing a fastened lamp inside a lamp casing before a spring is positioned in the final position according to this invention. A lamp casing 200 having a central space enclosed by four sidewall structures for accommodating a lamp 201 is shown in FIG. 4. Since FIG. 4 is a view from the side, only the left sidewall 204*a*, the upper sidewall 204*b* and the lower sidewall 204*c* can be seen. The upper sidewall 204*b* can simply be a connective structure linking the left sidewall 204*a* and the right sidewall 204*d*. The left sidewall 204*a* has a hook groove 206. When the lamp 201 is assembled and fastened, a strip-shaped spring 202 can be inserted into the hook groove 206. The strip-shaped spring 202 of this invention has a first end 202*a* having an internal recess and a second end 202*b* (shown in FIG. 9). There is an opening 108 between the left sidewall 204*a* and the bottom sidewall 204*c* similar to the conventional opening 108 shown in FIG. 2. Another conventional opening 104 is not required in this invention. After the strip-shaped spring 202 is slipped into the hook groove 206, the upper edge of the lamp 201 is enclosed. The end 202*a* of the spring 202 with the internal recess must subsequently pass through the opening 108 and fasten to the lamp 201.

Figure 5:
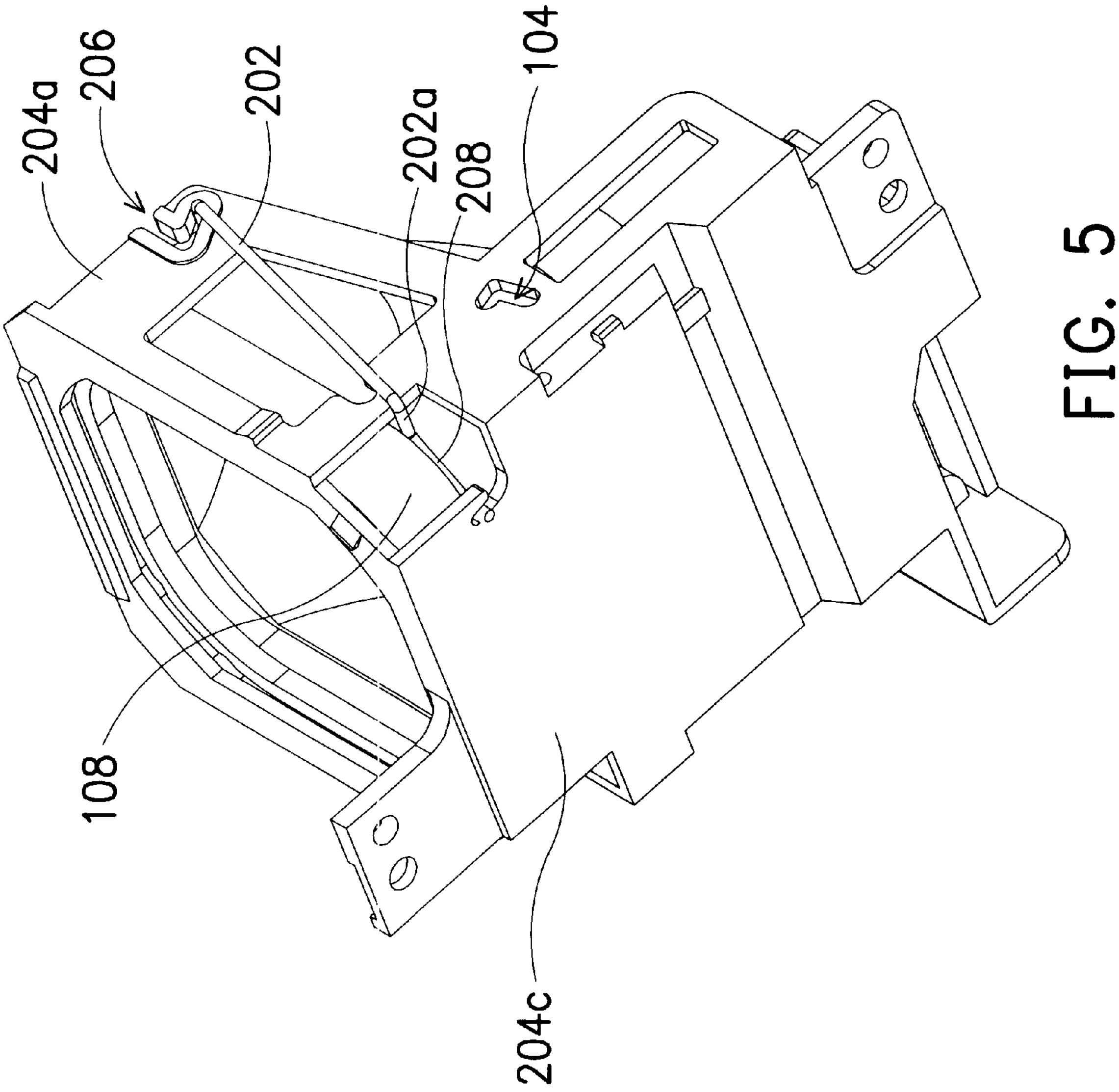
FIG. 5 is a perspective view looking from the bottom of the fastened lamp inside a lamp casing after the spring is positioned in the final position according to this invention.
Figure 6:
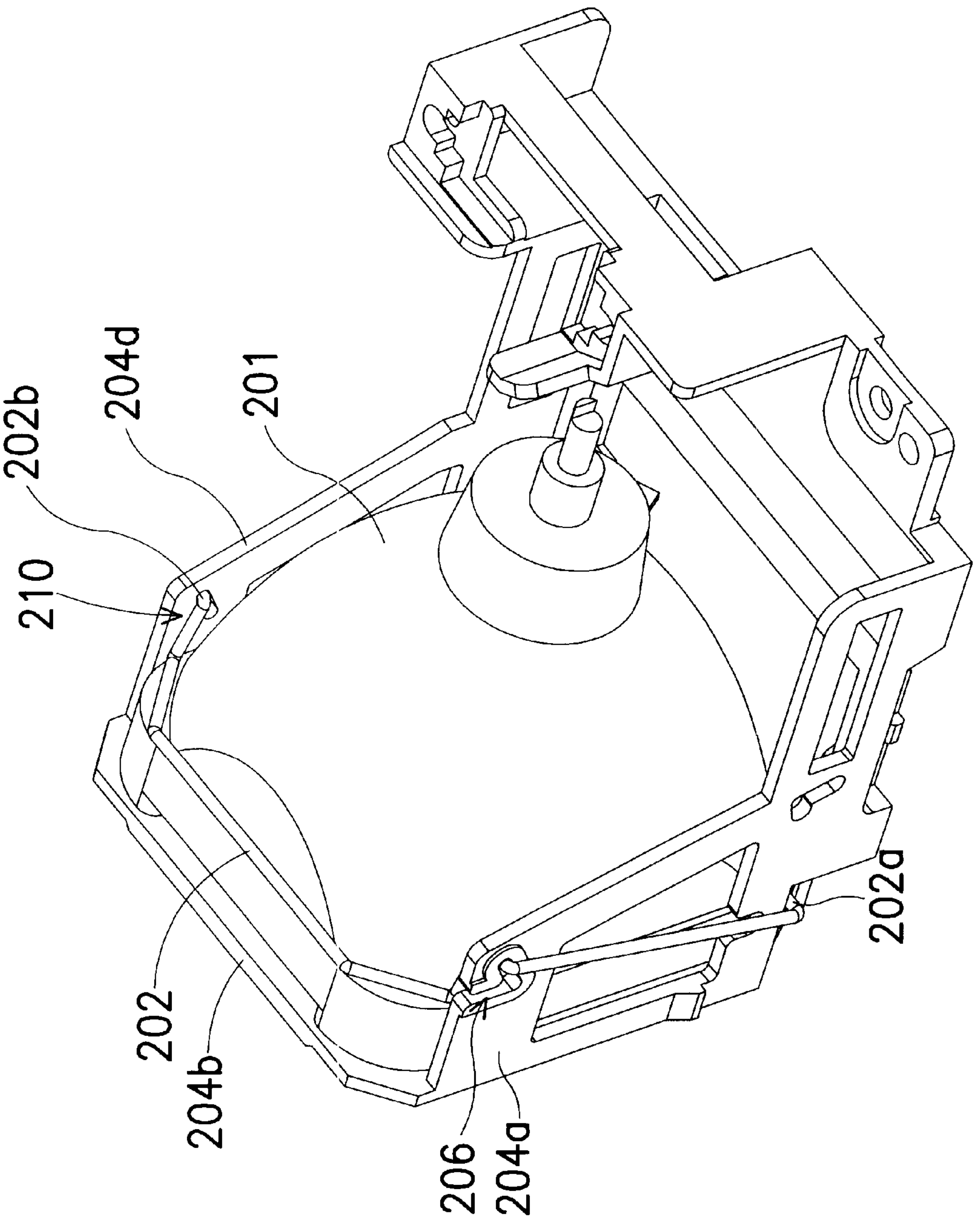
FIG. 6 is a top view of the fastened lamp inside the lamp casing according to this invention.
Figure 7:
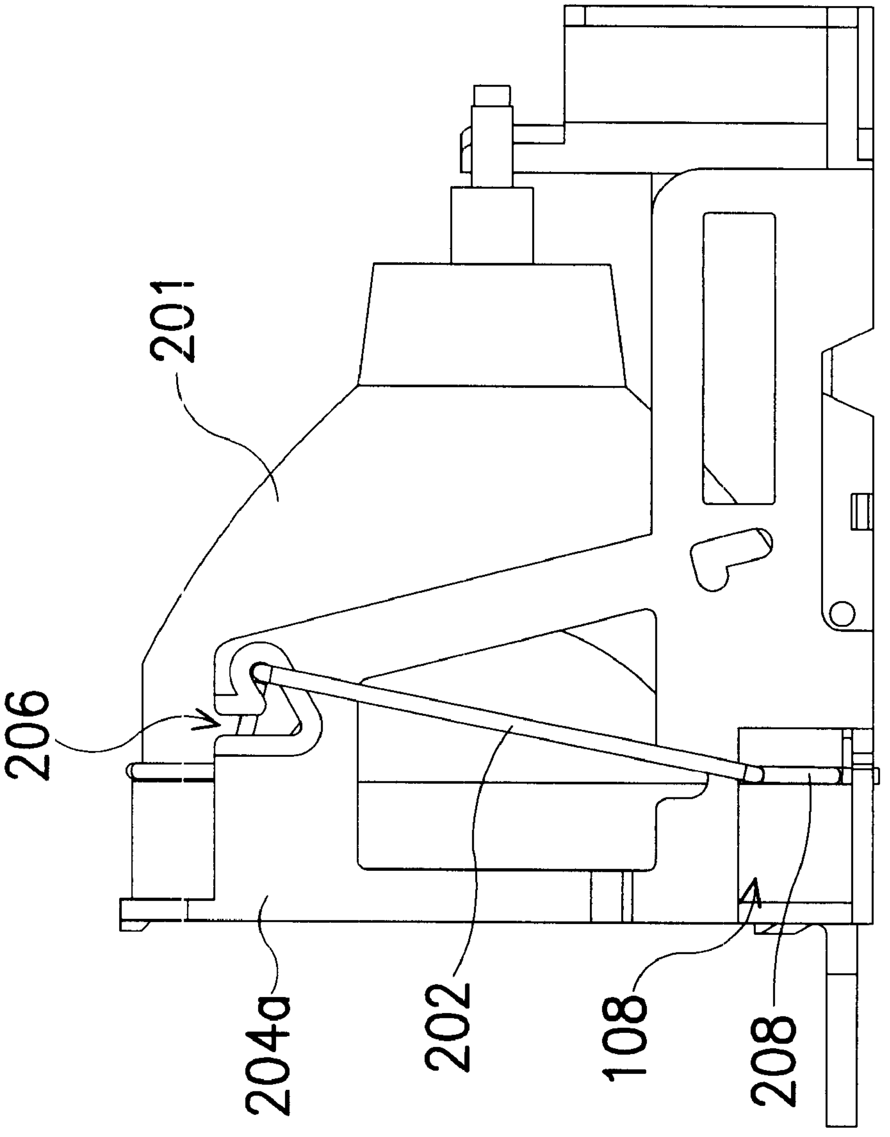
FIG. 7 is a right side view of the fastened lamp inside the lamp casing after the spring is positioned in the final position according to this invention.
Figure 8:
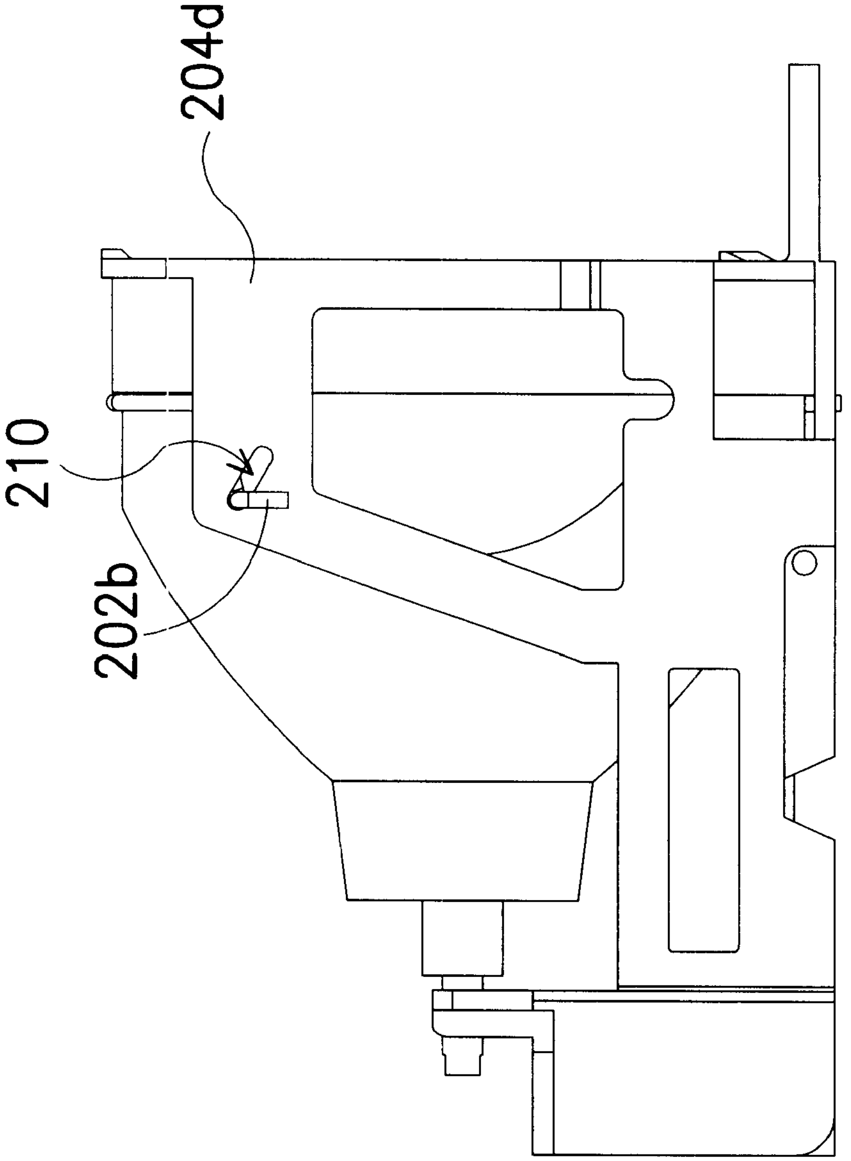
FIG. 8 is a left side view of the fastened lamp inside the lamp casing after the spring is positioned in the final position according to this invention.
Figure 9:
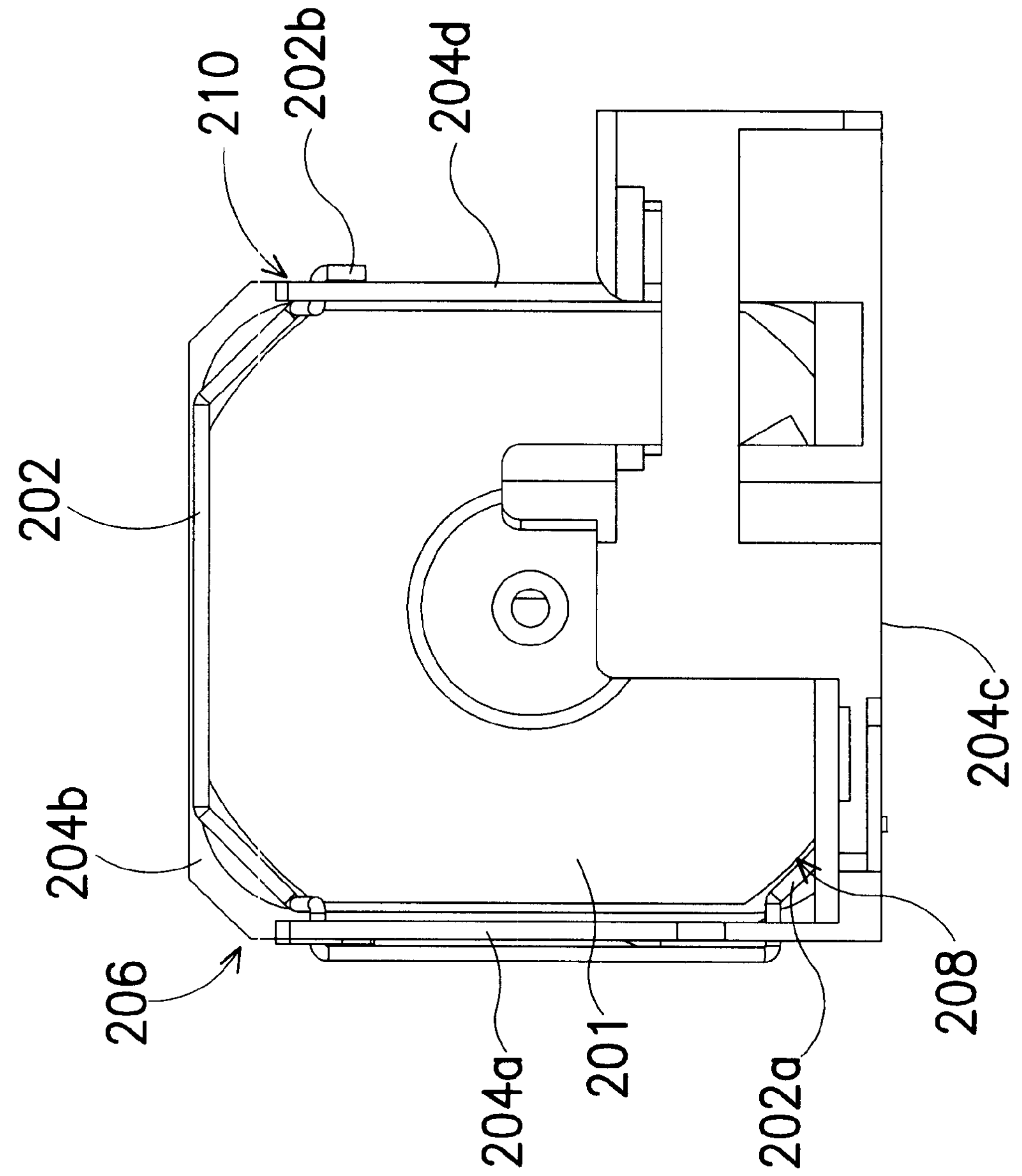
FIG. 9 is a back view of the fastened lamp inside the lamp casing after the spring is positioned in the final position according to this invention.

FIGS. 5 to 9 are a series of views looking from various angles after the projector lamp and the casing are assembled together. FIG. 5 is a perspective view looking from the bottom of the fastened lamp inside a lamp casing after the spring is positioned in the final position according to this invention. FIG. 6 is a top view of the fastened lamp inside the lamp casing according to this invention. FIG. 7 is a right side view of the fastened lamp inside the lamp casing after the spring is positioned in the final position according to this invention. FIG. 8 is a left side view of the fastened lamp inside the lamp casing after the spring is positioned in the final position according to this invention. FIG. 9 is a back view of the fastened lamp inside the lamp casing after the spring is positioned in the final position according to this invention.

As shown in FIGS. 5 to 7, the internal recess end 202*a* of the spring 202 has already passed through the opening 108 and fastened to a pre-formed recess groove 208 on the lamp 201. When the spring 202 is latched on the recess groove 208, stress produced by the deformation of the spring 202 is capable of pressing the three corners of the lamp firmly against the lamp casing 200. In FIG. 6, the right sidewall 204*d*, the opening 210 above the right sidewall 204*d* and the other end 202*b* of the spring 202 can be seen.

In FIGS. 8 and 9, the left sidewall 204*d* of the lamp casing 200, the opening 210 above the right sidewall 204*d*, the other end 202*b* of the spring 202 and their mutual relationships are shown in greater detail. When the other end 202*b* of the spring 202 is latched to the opening 210, subsequent bending firmly attaches the end 202*b* of the spring 202 to the right sidewall 204*d*.

In this invention, only a single spring 202 is required to fasten a lamp onto the lamp casing 200. Moreover, the hook groove 206 design also renders the latching of the spring 202 onto the sidewall much easier. Since the projector device provided by this invention differs only slightly from a conventional design, massive modification of production equipment in order to produce the device is not required.

Figure 2:
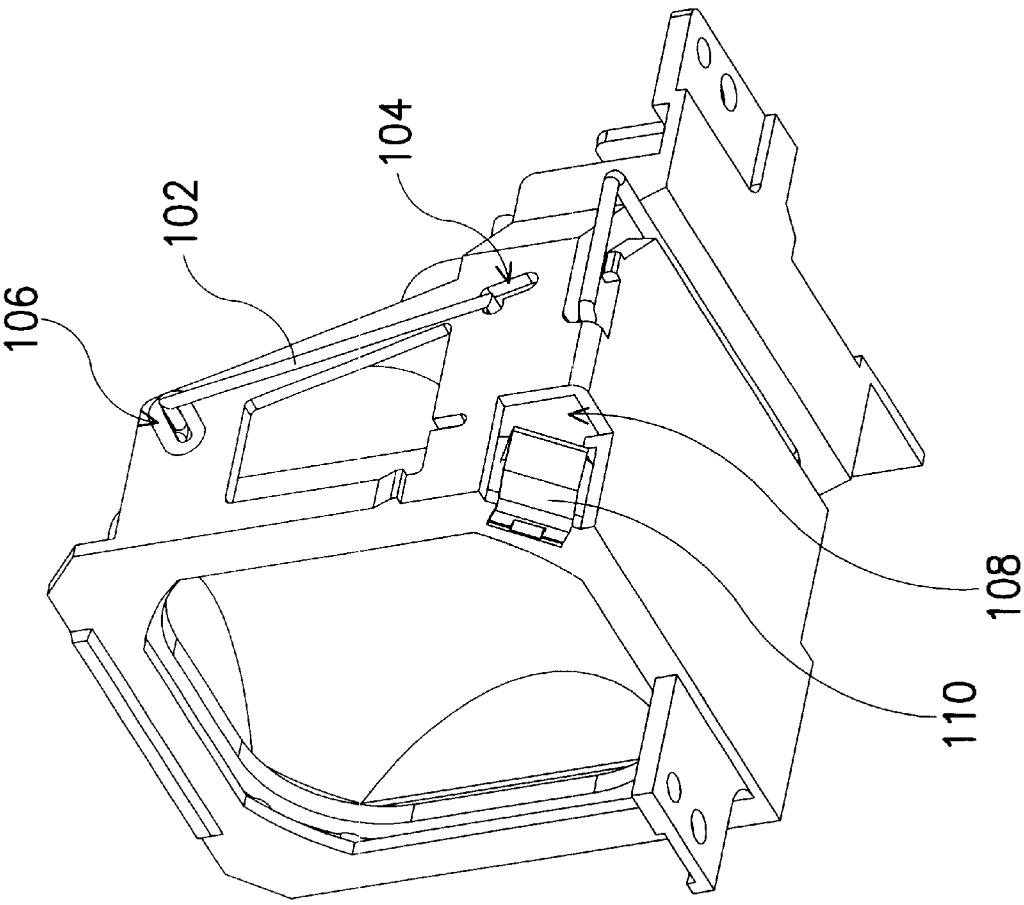
FIG. 2 (PRIOR ART)
FIG. 2 is a perspective view looking from the bottom of a conventional structure for fastening the projector lamp to a lamp casing structure after a spring is positioned in the final position.
Figure 3:
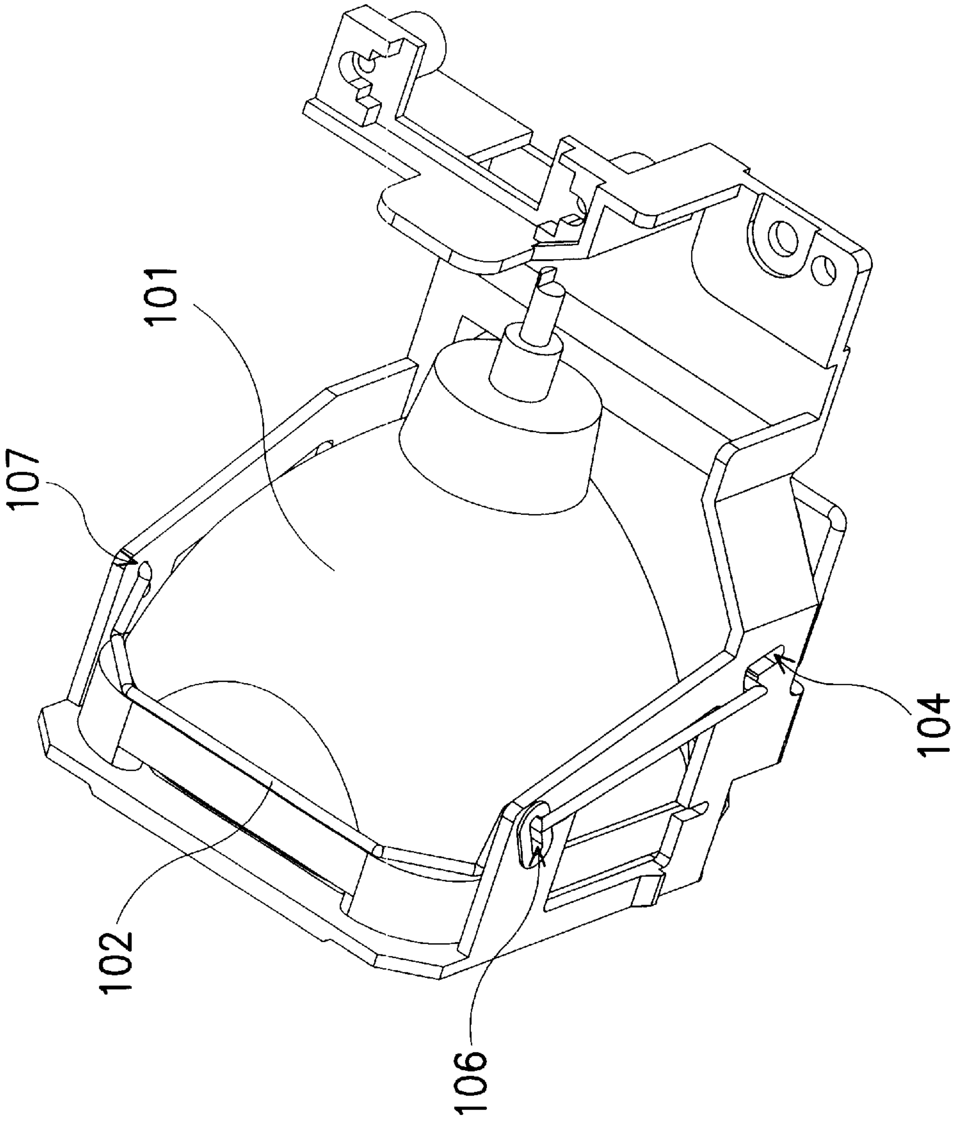
FIG. 3 (PRIOR ART)
FIG. 3 is a perspective view looking from the top of a conventional structure for fastening the projector lamp to a lamp casing structure after a spring is positioned in the final position.

The lamp 201 and the recess groove 208 together with the internal recess end 202*a* of the spring 202 can replace a conventional sheet-spring 110 shown in FIG. 2. Hence, the overall assembly process is simplified and the production cost is lowered.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fastening device for a projector lamp, comprising:

a lamp casing having a first sidewall, a second sidewall, a bottom wall and a connective structure that encloses a central space, wherein the first sidewall has a first opening, the second sidewall has a hook groove, and there is a second opening between the second sidewall and the bottom wall; and a strip-shaped spring having a first end and a second end having an internal recess structure for fastening the lamp onto the lamp casing, wherein the lamp is installed within the central space of the lamp casing, a middle section of the strip-shaped spring is latched by the hook groove on the second sidewall, the first end of the spring is fixed by the first opening on the first sidewall, the second end of the spring is inserted through the second opening such that the internal recess structure can engage with a recess groove on the lamp, and through the deform stress provided by the spring passing through the first opening, the hook groove and engaging with the recess groove on the lamp, the lamp is firmly fastened to the lamp casing.

2. The fastening device in claim 1, wherein the recess groove on the lamp is located on one of the edges of the lamp.

3. The fastening device of claim 1, wherein the second end of the strip-shaped spring has an internal linear recess profile capable of latching onto the recess groove on the lamp.

4. The fastening device of claim 1, wherein the lamp includes a lamp having rectangular sidewalls.

5. A fastening device for a projector lamp, comprising:

a lamp;

a lamp casing having a first sidewall, a second sidewall, a bottom wall and an upper horizontal connective structure that encloses a central space, wherein the first sidewall has an opening, the second sidewall has a hook groove, and there is a second opening between the second sidewall and the bottom wall; and a strip-shaped spring having a first end and a second end, wherein the second end has an internal recess structure, wherein the strip-shaped spring can insert through the hook groove, the first end of the spring can fasten onto the first opening, the second end of the spring can pass through the second opening and prop against the lamp, and the deform stress provided by the spring can fasten the lamp firmly to the lamp casing.

6. The fastening device of claim 5, wherein the walls of the lamp are made with shatter-resistant glass.

7. The fastening device of claim 5, wherein the lamp includes a lamp having rectangular sidewalls.

8. The fastening device of claim 5, wherein the lamp further includes a recess groove for the internal recess linear section of the second end of the spring to latch on.

9. The fastening device of claim 5, wherein the lamp further includes a recess opening for the second end of the strip-shaped spring to latch on and prop against the lamp.

* * * * *